United States Patent [19]

Hamaguchi

[11] Patent Number: 5,127,953

[45] Date of Patent: Jul. 7, 1992

[54] FAT OR OIL COMPOSITION IN POWDERY OR GRANULAR FORM AND A PROCESS FOR PRODUCING THE SAME

[75] Inventor: Takashi Hamaguchi, Sashima, Japan

[73] Assignee: Asahi Kasei Kogyo Kabushiki Kaisha, Osaka, Japan

[21] Appl. No.: 746,216

[22] Filed: Aug. 16, 1991

Related U.S. Application Data

[63] Continuation of Ser. No. 177,756, May 5, 1988, abandoned.

[30] Foreign Application Priority Data

Apr. 6, 1987 [JP] Japan ................... 62-82870
Feb. 16, 1988 [JP] Japan ................... 63-31954

[51] Int. Cl.⁵ ............................................. C08K 5/00
[52] U.S. Cl. .................................. 106/504; 106/477; 426/601; 426/610
[58] Field of Search ................. 106/477; 426/601, 610

[56] References Cited

U.S. PATENT DOCUMENTS

| | | | |
|---|---|---|---|
| 3,415,658 | 12/1968 | Cunningham et al. | 426/610 |
| 3,694,233 | 9/1972 | Kaplow et al. | 426/589 |
| 3,957,976 | 5/1976 | Sugimoto | 424/180 |
| 3,987,207 | 10/1976 | Spaeti et al. | 426/99 |
| 4,145,452 | 3/1979 | Cousin et al. | 426/601 |
| 4,252,834 | 2/1981 | Inamine et al. | 426/321 |

FOREIGN PATENT DOCUMENTS

| | | |
|---|---|---|
| 979730 | 12/1975 | Canada . |
| 54-126207 | 10/1979 | Japan . |
| 55-150845 | 11/1980 | Japan . |
| 61-13774 | 4/1986 | Japan . |
| WO86/00787 | 3/1986 | PCT Int'l Appl. . |
| 1356252 | 6/1974 | United Kingdom . |

*Primary Examiner*—William R. Dixon, Jr.
*Assistant Examiner*—Willie T. Thompson
*Attorney, Agent, or Firm*—Armstrong & Kubovcik

[57] ABSTRACT

A powdery or granular fat or oil composition in the form of a powder or granules having a water content of 15% by weight or less, a maximum particle diameter of not greater than 10 mm, an average particle diameter of not greater than 5 mm and an angle of repose of not greater than 70%. The composition is produced simply by mixing only a fat or oil, a base material capable of occlusion or absorption of the fat or oil and a liquid polyol at a temperature at which the fat or oil is molten.

9 Claims, No Drawings

FAT OR OIL COMPOSITION IN POWDERY OR GRANULAR FORM AND A PROCESS FOR PRODUCING THE SAME

This application is a continuation of application Ser. No. 177,756, filed May 5, 1988 abandoned.

BACKGROUND OF THE INVENTION

1. Field Of The Invention

The present invention relates to a fat or oil composition in powdery or granular form and a process for producing the same. More particularly, the present invention is concerned with a composition comprising a fat or oil, a base material having the fat or oil included therein by occlusion or absorption and a polyol having at least two hydroxyl groups, which composition is in the form of a powder or granules having a water content, a maximum particle diameter, an average particle diameter and an angle of repose in specific ranges. The fat or oil composition of the present invention has its fat or oil component well included therein by occlusion or absorption irrespective of whether the fat or oil component is liquid, semisolid or solid and has excellent handling characteristics because it has a good flowability. The composition is also advantageous in that when it is contacted with water, the fat or oil is quickly separated without forming an unfavorable emulsion with water, leading to great benefits in use for various food products. The present invention is also concerned with a simple and economical process for producing the abovementioned fat or oil composition.

2. Discussion Of Related Art

Powdery fat and oil products are widely used in various instant foods such as premixes for bread, cakes, cookies, doughnuts, pancakes, ice cream and the like.

Powdery fat and oil products have conventionally been produced by one of the following methods.

(1) A freeze-pulverizing method in which a solid fat or oil having a high melting point is pulverized at a low temperature to obtain a powder.

(2) A spray-cooling method in which a melted edible oil is sprayed into a chamber maintained at a low temperature (about 15° C.) to freeze the oil (see, for example, Japanese Patent Application Laid-Open Specification No. 54-126207).

(3) An absorption method in which a fat or oil is absorbed by an oleophilic material such as processed starch or cellulose.

(4) A spray-drying method in which an oil-in-water type emulsion that has been prepared using a synthetic emulsifying agent such as a sugar ester, a protein such as casein or gelatin, a starch, or the like, is spray-dried (see, for example, Japanese Patent Application Laid-Open Specification No. 55-150845).

The above-mentioned methods, however, have the folowing problems.

In method (1), only a hardened oil having a melting point of 60° C. or higher can be used as a starting material. For this reason, the powdery fat or oil product obtained by this method does not melt even upon eating and, therefore, cannot suitably be used in premixes such as cake mixes.

In method (2), only a solid fat or oil can be used as a starting material. Further, the powdery fat or oil product obtained by this method does not contain any substance for immobilizing a fat or oil and, therefore, is required to be refrigerated during storage and transportation.

With respect to method (3), if the fat or oil content of the powdery product obtained is high, not only the fat or oil is likely to exude from the powdery product, but also the flowability of the powdery product is decreased. Therefore, the fat or oil content of the powdery product is required to be low.

In method (4), the emulsion to be spray-dried is required to have a water content as high as about 70 to 90% in order to keep the viscosity of the emulsion at a level suitable for spray drying. For this reason, the amount of water to be evaporated is very large, leading to extremely high energy costs. Further, the powdery fat or oil product obtained by this method forms an emulsion with water and, therefore, has only limited use.

It is conceivable to use powdery fat and oil products not only in premixes for pastry and ice cream as mentioned above but also in powdery soup mixes for instant noodle soup and in other type soup mixes, powdery roux mixes and powdery or granulated mixes for seasonings having high oil contents, such as condiments for use in Chinese food, salad dressings and mayonnaise. However, none of the powdery fat and oil products produced by the above-mentioned conventional methods can suitably be used in these soup mixes and seasoning mixes for the following reasons. Premixes containing a seasoning oil, such as premixes for instant noodle soup, Chinese soup and salad dressing are desired to have properties such that when water is added to the premix in order to prepare the soup or dressing, the oil component of the soup or dressing rapidly separates out and floats on the surface of the soup or dressing so as to enhance the flavor of the seasoning oil. As mentioned above, the powdery fat or oil product obtained by method (4) (spray-drying method) is likely to form a white emulsified, turbid mixture when the product is contacted with water. Therefore, if this product is used in premixes for soup or dressing containing a seasoning oil, when a soup or dressing is prepared from the premix, the oil component will not separate out and, therefore, will not fully exhibit the flavor thereof. Further, in methods (3) and (4), which may be applied to liquid oils and semisolid fats, special materials such as processed starch, cellulose, casein, gelatin and soybean protein are necessarily used as a component of the powder. Therefore, the use of the powdery fat or oil product obtained by method (3) or (4) in premixes for cakes, soup, seasonings and the like, is very likely to adversely affect the taste, flavor, texture and other eating characteristics of the food prepared from the premix.

For these reasons, the premixes now available for soup and condiments containing a fat or oil are limited to the following types.

(1) A premix in which a fat or oil component is independently packaged in a liquid or semisolid state. The other ingredients are separately packaged in powdery state.

(2) A premix in which a fat or oil component is packaged together with the other ingredients. The whole premix is in the state of a liquid or a paste.

(3) A powdery premix in which a fat or oil component has been absorbed by the other ingredients in a powdery state.

Premixes of types (1) and (2) are disadvantageous from the viewpoint of ease of handling of the premix in packaging and cooking processes. A premix of type (3)

is also disadvantageous in that the amount of fat or oil which can be contained in the premix is required to be extremely small in order to avoid exudation of the fat or oil from the premix.

On the other hand, International (PCT) Patent Application Publication No. WO 86/00787 discloses the use of a liquid polyol in a composition containing a fat or oil. The addition of a liquid polyol to a composition containing a fat or oil results in an increase in viscosity of the fat or oil. Thus, normally flowable fats and oils contained in food products such as chocolate and peanut butter can be immobilized at temperatures above their normal melting point, leading to improvements in heat resistance of chocolate, prevention of separation of peanut oil from peanut butter and the like. However, a fat or oil composition in the form of a powder or granules is not described.

Japanese Patent Application Publication No. 61-13774 discloses a powdery fat or oil composition comprising an edible fat or oil having a melting point of 35° C. or lower, an enzymatically decomposed starch, a glycerine ester of a saturated aliphatic acid and/or a sorbitan ester of an unsaturated aliphatic acid. When water is added to this composition to obtain a mixture, oil drops are formed on the surface of the aqueous phase of the mixture but the aqueous phase becomes turbid. Further, unless the enzymatically decomposed starch to be used in this composition has an extremely large surface area, a desired powdery composition cannot be obtained.

SUMMARY OF THE INVENTION

With a view toward developing a powdery fat or oil product free from the above-mentioned problems, the present inventor has made extensive and intensive studies. As a result, it has unexpectedly been found that by mixing a fat or oil, a base material capable of occlusion or absorption of the fat or oil and a polyol having at least two hydroxyl groups in specific proportions while agitating at a temperature at which the fat or oil melts, a unique powdery or granular fat or oil composition can be obtained, in which the fat or oil is occluded or absorbed in the base material. Such a powdery or granular fat or oil composition has been found to have the following advantages.

(1) A wide variety of food materials may be used as the base material capable of occlusion or absorption of a fat or oil. Therefore, a fat or oil composition which is suitable for use in a particular premix such as a seasoning mix or a cake mix may be prepared by employing one of the essential ingredients of the premix as the base material capable of occlusion or absorption of a fat or oil. Such a fat or oil composition does not affect the taste, flavor, texture and other eating characteristics of the food prepared from the premix.

(2) When the composition of the present invention is contacted with water, the fat or oil rapidly separates out from the composition without forming an emulsion with the water. Therefore, if a seasoning oil is used in the composition of the present invention, when water is added to the composition, the oil is rapidly separated out from the composition and exhibits a strong flavor inherent of the oil.

(3) The composition of the present invention may have a high oil content as compared with the powdery fat or oil product obtained by the conventional absorption method, without the danger of exudation of the fat or oil and, therefore, it is capable of maintaining good flowability despite its high oil content.

(4) Any types of fats and oils, irrespective of whether they are liquids, semisolids or solids, may be used in the composition of the present invention. Therefore, the composition of the present invention has a wide variety of uses.

In addition, it is noted that the process for producing the above-mentioned composition does not require a drying step and, therefore, is extremely simple and economical.

Accordingly, it is an object of the present invention to provide a fat or oil composition in the form of a powder or granules, which has its fat or oil component well included therein by occlusion or absorption irrespective of whether the fat or oil component is liquid, semisolid or solid and has excellent handling characteristics because it has a good flowability. The composition is also advantageous in that when it is contacted with water, the fat or oil is quickly separated without forming an unfavorable emulsion with water, leading to great benefits in use for various food products.

It is another object of the present invention to provide a simple and economical process for producing a fat or oil composition of the above kind.

DETAILED DESCRIPTION OF THE INVENTION

In one aspect of the present invention, there is provided a fat or oil composition comprising (a) a fat or oil, (b) a base material having said fat or oil included therein by occlusion or absorption and (c) a polyol having at least two hydroxyl groups, said composition being in the form of a powder or granules having a water content of 15% by weight or less, a maximum particle diameter of not greater than 10 mm, an average particle diameter of not greater than 5 mm and an angle of repose of not greater than 70°.

As the base material, there may be employed a substance capable of inclusion of a fat or oil by occlusion or absorption. A hydrophilic substance capable of occlusion or absorption of a fat or oil may preferably by employed. Examples of hydrophilic substances usable as the base material include hydrophilic proteins such as gelatin, casein, sodium caseinate, whey protein and albumin; hydrophilic polysaccharides such as starch, alginates, gum arabic, guar gum, xanthan gum, pectin, carboxymethylcellulose and agarose; partially hydrolyzed proteins such as hydrolyzed animal proteins (HAP) and hydrolyzed vegetable proteins (HVP); partially hydrolyzed starch such as dextrin and oligosaccharides; hydrophilic amino acids such as glutamic acid and lysine and salts thereof; saccharides such as lactose; organic acids such as acetic acid, citric acid, succinic acid and adipic acid and salts thereof; nucleotides such as 5'-sodium inosinate and 5'-sodium guanylate and salts thereof; common salts such as sodium chloride and potassium chloride; mixtures thereof; and food compositions containing at least one of the above-mentioned substances The term "food composition" as used herein is intended to mean food materials obtained by processing stock meat, fish and shellfish, eggs, milk, cereals, vegetables, fruits, seaweeds or the like. Specific examples of food compositions containing at least one of the above-mentioned substances include dextrin, syrup solid, powdered egg white, skimmilk powder, whey powder, soybean flour, gelatinized wheat flour, natural seasonings such as HAP and HVP, powdered sauces such as powdered soy sauce, powdered vinegar, powdered miso and powdered ketchup.

It is preferable that the base material does not contain an emulsifiable substance such as lecithin.

The water content of the base material may be such that the ultimate fat or oil composition of the present invention has a water content of 15% by weight or less, and is preferably 15% by weight or less, more preferably 10% by weight or less. The water content of the base material is determined by a method described later with respect to the measurement of the water content of a fat or oil composition.

Further, the packed bulk density of the base material should preferably not be higher than 0.9 g/ml, more preferably not higher than 0.8 g/ml. The term "packed bulk density" as used herein is intended to mean the bulk density of a base material sample which has been subjected to treatment for most dense packing. Specifically, the packed bulk density is determined as follows. A container of a given capacity (V) is loosely filled with an excessive volume of a base material sample. Then, the sample is tapped 180 times in 216 seconds. After a portion of the sample which is in excess of the capacity of the container is removed, the weight of the sample in the container is weighed (W). The packed bulk density (D) is calculated from the following formula:

$$D \text{ (g/ml)} = \frac{W(g)}{V(ml)}$$

[for more detailed information, see, for example, Sigeo Miwa and Sigesuke Hidaka, "Funtai Kogaku Jikken Manual (Manual of Experiments for Micromeritics)", Nikkan Kogyo Simbunsha, Japan, 1984].

The shape of the base material is not particularly limited. However, the base material may preferably be in the form of a powder having spherical particles. The particle diameter of the powder is preferably 50 mesh pass or less, more preferably 100 mesh pass or less in terms of Tyler mesh.

The fat or oil which may be employed in the composition of the present invention is not particularly limited, that is, it may be a vegetable oil or an animal fat or oil in the form of a solid, semisolid or liquid, or a mixture thereof. However, the excellent effects of the composition of the present invention are especially notable when a liquid oil or a semisolid fat or oil is used. Examples of fats and oils which may be employed in the present invention include, in addition to common fats and oils, seasoning oils which are obtained by heating materials such as garlic, ginger, onion, spring onion, stock meat, fish, shellfish and the like in a vegetable oil, animal fat or oil, or the like to thereby heat-extract the flavor essence into the oil, and oleoresins which are obtained by subjecting a vegetable or animal product to extraction with a solvent having a low boiling point, such as ethylene dichloride, hexane, acetone or ether so as to extract constituents of the product, such as an essential oil, a pigment, a fat or oil, a resin and a flavoring substance, which are soluble in the solvent, and removing the solvent from the extract.

Examples of polyols having at least two hydroxyl groups which may be suitably employed in the present invention include glycerin, nontoxic glycols such as propylene glycol, saccharides and sugar alcohols. Of them, a polyol which is liquid at room temperature is preferable. As such a polyol, glycerin is preferable.

The fat or oil composition of the present invention has a water content of 15% by weight or less, preferably 10% by weight or less. If the water content is higher than 15% by weight, the cohesiveness of the particles of the composition becomes high and a high degree of agglomeration of the particles is likely to occur, leading to a decrease in flowability of the composition. With respect to the reason why a water content higher than 15% by weight results in a high degree of agglomeration of the particles of the composition, it is believed as follows. If the water content is 15% by weight or less, the fat or oil is well contained in the voids of a three dimensional structure formed by the crosslinking, by the action of the polyol, of the primary particles of the base material. In contrast, if the water content is higher than 15% by weight, part of the three dimensional structure degrades and the fat or oil is expelled from the three dimensional structure, thereby causing the degree of agglomeration of the particles of the composition to be increased.

In the present invention, the water content of a fat or oil composition is determined by the following method. About 1 g of a sample is put into a container having a given weight and weighed ($W_1$). Then, the sample is put into a forced hot air circulation type constant temperature electric dryer and dried at 105° C. for about 3 hours until the weight of the sample becomes constant. After the dried sample is allowed to cool in a desiccator, the sample is weighed ($W_2$). The water content of the sample (C) is calculated from the following formula:

$$C \text{ (\%)} = \frac{W_1 - W_2 \text{ (g)}}{W_1 \text{ (g)}} \times 100$$

The powdery or granular fat or oil composition of the present invention has a maximum particle diameter of not greater than 10 mm, preferably not greater than 5 mm, an average particle diameter of not greater than 5 mm, preferably not greater than 2 mm, and an angle of repose of not greater than 70°, preferably not greater than 60°. If the maximum particle diameter, the average particle diameter and the angle of repose are within the above-mentioned respective ranges, the composition has a good flowability and a good solubility in water, which is especially advantageous when the compound is used in cake mixes, soup mixes, seasoning mixes or the like.

In the present invention, the maximum particle diameter and the average particle diameter is determined by sieve analysis using a standard sieve (Tyler).

The angle of repose is determined by a fixed bed cone method.

In the fat or oil composition of the present invention, the proportions of (a) a fat or oil (b) a base material having the fat or oil occluded or absorbed therein and (c) a polyol are preferably 1 to 70% by weight, 30 to 99% by weight and 0.1 to 10% by weight, based on the total weight of the components (a), (b) and (c), respectively, more preferably 20 to 50% by weight, 50 to 80% by weight and 2 to 5% by weight, respectively. The fat or oil composition comprising the components (a), (b) and (c) in the above-mentioned proportions has an advantage in that exudation of the fat or oil is especially small, leading to an excellent flowability.

The fat or oil composition of the present invention as described above can advantageously be produced by the process described hereinbelow.

In another aspect of the present invention, there is provided a process for producing a fat or oil composition in the form of a powder or granules, which comprises intimately mixing 1 to 70% by weight, based on the total weight of the components (a), (b) and (c), of (a) a fat or oil, 30 to 99% by weight, based on the total weight of the components (a), (b) and (c), of (b) a base material capable of occlusion or absorption of said fat or oil and 0.1 to 10% by weight, based on the total weight of the components (a), (b) and (c), of (c) a liquid polyol having at least two hydroxyl groups, the intimate mixing of the components (a), (b) and (c) being performed by mixing two different components selected from the components (a), (b) and (c) and mixing the resultant mixture with the remaining component or by mixing the components (a), (b) and (c) simultaneously, the mixing in which the component (a) is involved being performed at a temperature higher than the melting point of said fat or oil.

In the process of the present invention, 1 to 70% by weight, based on the total weight of the components (a), (b) and (c), of (a) a fat or oil, 30 to 99% by weight, based on the total weight of the components (a), (b) and (c), of (b) a base material capable of occlusion or absorption of said fat or oil and 0.1 to 10% by weight, based on the total weight of the components (a), (b) and (c), of (c) a liquid polyol are intimately mixed. In mixing the components (a), (b) and (c), the system is agitated at a temperature at which the fat or oil is molten, i.e., at a temperature higher than the melting point of the fat or oil.

With respect to the manner of mixing the components (a), (b) and (c), any of the following methods may be adopted.

(1) a method in which (a) a fat or oil and (b) a base material are uniformly mixed together and then the resultant mixture is mixed with (c) a polyol, (2) a method in which (c) a polyol is uniformly dispersed in (a) a fat or oil and then the resultant mixture is mixed with (b) a base material, (3) a method in which (b) a base material and (c) a polyol are uniformly mixed together and then the resultant mixture is mixed with (a) a fat or oil, and (4) a method in which (a) a fat or oil, (b) a base material and (c) a polyol are mixed together at once.

That is, the intimate mixing of the components (a), (b) and (c) may be performed by mixing two different components selected from the components (a), (b) and (c) and mixing the resultant mixture with the remaining component or by mixing the components (a), (b) and (c) simultaneously. In this connection, it should be noted that the mixing in which the component (a) is involved is performed at a temperature higher than the melting point of said fat or oil.

The polyol to be used in the present invention is in a liquid form at least at the time of mixing with the other components. That is, for example, when a glycol such as propylene glycol or a glycerin is used as the polyol, the glycol or glycerin is kept at a temperature higher than its melting point and when a saccharide or a sugar alcohol is used as the polyol, the saccharide or sugar alcohol is used in the form of an aqueous solution having a concentration as high as possible.

Generally, a fat or oil is composed of several types of triglyceride. In the present invention, the mixing of a fat or oil with the other components is conducted at a temperature at which the triglycerides constituting the fat or oil are melted, i.e., at a temperature higher than the melting point of the fat or oil. In the present invention, the melting point of the fat or oil means an ascending melting point of the fat or oil. The ascending melting point of the fat or oil is determined as follows. A sample fat or oil in a molten state is filtered using a dry filter paper. Then, one end portion of a capillary is dipped in the filtered fat or oil in a molten state to thereby cause the fat or oil to enter the inside of the capillary and reach the height of about 10 mm. The capillary having the melted fat or oil containing therein is allowed to stand at a temperature of 10° C. or lower for 24 hours or allowed to stand on ice for 1 hour to thereby solidify the fat or oil. Then, the capillary having the solidified fat or oil containing therein is attached to a thermometer in a manner such that the above-mentioned one end portion of the capillary is contacted with the lower end portion of the thermometer. The capillary attached to the thermometer is dipped in distilled water contained in a beaker (capacity:600 cc) so that the lower end of the thermometer is about 30 mm below the water surface. The water in the beaker is heated while stirring. The ascending melting point is defined as a temperature at which the fat or oil begins to ascend in the capillary [for more detailed information on the method of determining the ascending melting point, reference may be made to, for example, pages 317 and 318 of "Yushi Kagaku Binran (Handbook of Fat and Oil Chemistry)" edited by Nippon Abura Kagaku Kyokai (Japanese Society of Oil Chemistry) and published by Maruzen, Japan in 1958].

The total water content of the (a) fat or oil, (b) base material and (c) polyol at the time of mixing the components (a), (b) and (c) is preferably 15% by weight or less, more preferably 10% by weight or less. This is because conversion of the components (a), (b) and (c) into a powder or granules by the action of the polyol is unlikely to occur in a water-rich system. However, it is noted that the composition of the present invention may also be produced by a method in which a mixture of the components (a), (b) and (c) is added to water and vigorously agitated in the absence of an emulsifying agent to form an emulsion, which is then subjected to spray-drying, thereby decreasing the water content to 15% by weight or less to obtain a powdery product. This method is disadvantageous in that it needs a drying step.

In the present invention, there is no specific limitation with respect to an apparatus for the mixing of the fat or oil, base material and liquid polyol. Mixers, kneaders, granulators, etc. which are usually used in a conventional process for food production may be employed. Examples of apparatuses include a ribbon blender, a screw mixer, a dough mixer, a grinder, various kneaders, a mixing granulator, a fluidized-bed granulator and an extrusion granulator. The mixing time is appropriately selected depending on the production scale, the types of the raw materials, etc.

In the process of the present invention, by the use of a high-speed stirring granulator or a fluidized-bed granulator having an agitating element, there is obtained a powdery product or a granular product having a relatively uniform particle diameter in the range of from 200 to 1000 μm.

When the above-mentioned types of apparatus are not used and/or when particle diameters in other ranges are desired, a powdery or granular product obtained may be subjected to sifting, whereby a powdery or granular product having a desired particle diameter can be selectively obtained.

It is important in the production of the fat or oil composition of the present invention to uniformly disperse 0.1 to 10% by weight of a liquid polyol in the other components. When the polyol is a high viscosity liquid such as glycerin or a high concentration aqueous solution of sugar alcohol, uniform dispersion of the polyol in the other components can be easily attained by heating such a high viscosity polyol to decrease the viscosity and spraying the resultant low viscosity polyol on the other components while mixing the other components.

The reason why the fat or oil can readily be occluded or absorbed in the base material in the process of the present invention, and the reason why the powdery or granular fat or oil composition of the present invention can readily release the fat or oil upon contact with water have not clearly been elucidated, but it is presumed as follows. When a fat or oil, a base material and a liquid polyol are intimately mixed together, the polyol acts to crosslink the primary particles of the hydrophilic base material, thereby forming a hydrophilic three dimensional structure while the fat or oil is included in the voids of the three dimensional structure. Thus, upon contact with water, the hydrophilic three dimensional structure comprising the hydrophilic base material and the polyol is dissolved away, releasing the fat or oil.

The composition of the present invention has the following excellent effects.

In the composition of the present invention, a wide variety of food materials may be used as the base material capable of occlusion or absorption of a fat or oil. Therefore, a fat or oil composition which is suitable for use in a particular premix such as a seasoning mix or a cake mix may be prepared by employing one of the essential ingredients of the premix as the base material capable of occlusion or absorption of a fat or oil. Such a fat or oil composition does not affect the taste, flavor, texture and other eating characteristics of the food prepared from the premix. Further, the use of one of the essential ingredients of the premix as the base material is economically advantageous.

Further, as is apparent from the formulation and physical structure, the composition of the present invention can readily be degraded in water. Therefore, when the composition is contacted with water, the fat or oil quickly separates out from the composition to form an oil phase and water phase, both of which are clearly separated from each other, that is, the composition does not form an emulsion. Therefore, the composition of the present invention is suitable for use in, e.g., a seasoning mix, a soup mix or the like. Further, if a seasoning oil is used in the composition of the present invention, when the composition is contacted with water, the seasoning oil is rapidly separated out from the composition and exhibits a strong flavor inherent of the oil.

Further, the composition of the present invention may have a high oil content relative to the powdery fat or oil product obtained by the conventional absorption method, without the danger of exudation of the fat or oil and, therefore, it is capable of maintaining good flowability despite its high oil content.

Moreover, any types of fats and oils, irrespective of whether they are in liquid, semisolid or solid state, may be used in the composition of the present invention. Therefore, the composition of the present invention has a wide variety of applications.

Still further, with respect to the production process, the composition of the present invention is produced simply by mixing only a fat or oil, a base material, and a polyol while agitating. Thus, the present process for producing a fat or oil composition is more simple and cost-saving than any conventional process.

The present invention will now be described in more detail with reference to the following Examples, which should not be construed as limiting the scope of the present invention.

In the following Examples, the angle of repose of a powdery or granular product of the present invention was measured by Powder Flow Characteristic Meter (powder tester manufactured and sold by Hosokawa Micron Corporation, Japan).

EXAMPLE 1

30 parts by weight of cocoa butter which had been melted in a hot bath at 45° C. and 70 parts by weight of dextrin [dextrose equivalent(DE):3.5] having a water content of 5.3%, a packed bulk density of 0.56 g/ml and a spherical shape of 50 mesh pass (Tyler) were well kneaded manually by means of a stainless spatula for 1 min. in a 250 ml plastic vessel. Then 4.5 parts by weight of glycerin were added to the resultant mixture and then kneaded for 10 min, at 45° C., thereby obtaining a powdery fat composition product.

The thus obtained powdery fat composition product had a water content of 6.5%, an average particle diameter of 700 μm, a maximum particle diameter of 2.0 mm and an angle of repose of 44°. The powdery product did not exhibit any exudation of fat and had an extremely good flowability.

EXAMPLE 2

35 parts by weight of soybean oil and 65 parts by weight of dextrin (DE: 7.5) having a water content of 5.5%, a packed bulk density of 0.63 g/ml and a spherical shape of 50 mesh pass (Tyler) were well kneaded manually by means of a stainless spatula for 1 min. in a 250 ml plastic vessel. Then, 3 parts by weight of propylene glycol were added to the resultant mixture and then kneaded for 15 min. at 15° C., thereby obtaining a powdery oil composition product.

The thus obtained powdery oil composition product had a water content of 7.4%, an average particle diameter of 1200 μm, a maximum particle diameter of 6.0 mm and an angle of repose of 43°. The powdery oil product did not exhibit any exudation of oil and had an extremely good flowability.

When the powdery oil composition product was dissolved in hot water, the oil was rapidly separated out from the powder, thereby leaving the water phase clear.

EXAMPLE 3

30 parts by weight of cocoa butter which had been melted in a hot bath at 45° C. and 70 parts by weight of dextrin (DE:3.5) having a water content of 5.3%, a packed bulk density of 0.56 g/ml and a spherical shape of 50 mesh pass (Tyler) were well kneaded manually by means of a stainless spatula for 1 min. in a 250 ml plastic vessel. Then 5 parts by weight of propylene glycol were added to the resultant mixture and then kneaded for 20 min. at 40° C., thereby obtaining a powdery fat composition product.

The thus obtained powdery fat composition product had a water content of 6.6%, an average particle diameter of 470 μm, a maximum particle diameter of 1.5 mm and an angle of repose of 53°. The powdery fat composition product did not exhibit any exudation of fat and had an extremely good flowability.

EXAMPLE 4

30 parts by weight of soybean oil and 70 parts by weight of sweet whey powder having a water content of 7.0%, a packed bulk density of 0.59 g/ml and a spherical shape of 50 mesh pass (Tyler) were well kneaded manually by means of a stainless spatula for 1 min. in a 250 ml plastic vessel. Then 4 parts by weight of glycerin were added to the resultant mixture and kneaded for 5 min. at 25° C., thereby obtaining a powdery oil composition product.

The thus obtained powdery oil composition product had a water content of 9.9%, an average particle diameter of 930 μm, a maximum particle diameter of 4.0 mm and an angle of repose of 39°. The powdery oil composition product exhibited almost no exudation of oil and had an extremely good flowability. The above-obtained powdery oil composition product is useful as an oil source in premixes for, e.g., a cake batter and a cookie.

EXAMPLE 5

40 parts by weight of palm oil which had been melted in a hot bath at 50° C. and 60 parts by weight of skim-milk powder having a water content of 3.8%, a packed bulk density of 0.79 /ml and a spherical shape of 50 mesh pass (Tyler) were well kneaded manually by means of a stainless spatula for 1 min. in a 250 ml plastic vessel using a stainless spatula. Then 5 parts by weight of glycerin were added to the resulting mixture and then kneaded for 5 min. at 50° C., thereby obtaining a powdery oil composition product.

The thus obtained powdery oil composition product had a water content of 11.5%, an average particle diameter of 1,050 μm, a maximum particle diameter of 6.5 mm and an angle of repose of 46°. The powdery oil composition product exhibited almost no exudation of oil and had an extremely good flowability.

Using the above-obtained powdery oil composition product, wheat flour and sugar, a cake mix was prepared. Then, from the cake mix, cake was prepared. Since the base material used in the powdery oil composition product, i.e., skimmilk powder, was an essential ingredient of a cake mix, the taste, flavor and texture of the cake was not affected by the use of the powdery oil product in the premix.

EXAMPLE 6

45 parts by weight of corn oil and 55 parts by weight of egg-white powder having a water content of 6.5%, a packed bulk density of 0.55 g/ml and a spherical shape of 50 mesh pass (Tyler) were well kneaded manually by means of a stainless spatula for 1 min. in a 250 ml plastic vessel. Then 2.5 parts by weight of glycerin were added to the resultant mixture and then kneaded for 15 min. at 15° C., thereby obtaining a powdery oil composition product.

The thus obtained powdery oil composition product had a water content of 6.8%, an average particle diameter of 1,200 μm, a maximum particle diameter of 6.5 mm and an angle of repose of 34°. The powdery oil composition product exhibited almost no exudation of oil and had an extremely good flowability as a powder.

Using the above-obtained powdery oil composition product, wheat flour, sugar, skimmilk powder and baking powder, a premix for steam-cooked bread for cooking in a microwave oven was prepared. Then, from the premix, a steam-cooked bread was prepared. Since the base material used in the powdery oil composition product, i.e., egg-white powder, was an essential ingredient of a premix for the steam-cooked bread, the taste, flavor and texture of the bread were not affected by the use of the powdery oil composition product in the premix.

EXAMPLE 7

32.5 parts by weight of cottonseed oil and 67.5 parts by weight of dextrin (DE:9.0) having a water content of 5.5%, a packed bulk density of 0.62 g/ml and a spherical shape of 50 mesh pass (Tyler) were well kneaded manually by means of a stainless spatula for 1 min. in a 250 ml plastic vessel. Then 3 parts by weight of glycerin were added to the resultant mixture and then kneaded for 5 min. at 30° C., thereby obtaining a powdery oil composition product.

The thus obtained powdery oil composition product had a water content of 6.4%, an average particle diameter of 860 μm, a maximum particle diameter of 6.0 mm and an angle of repose of 49°. The powdery oil composition product exhibited almost no exudation of oil and had an extremely good flowability.

The thus obtained powdery oil composition product was blended with powdered vinegar, common salt, monosodium glutamate, hydrolyzed vegetable protein, sugar and spices, to thereby prepare a dressing mix. When the above-obtained dressing mix was dusted over a wet vegetable, the powder was quickly dissolved, causing the oil to be smoothly separated.

EXAMPLE 8

35 parts by weight of butter oil which had been melted in a hot bath at 45° C. and 65 parts by weight of (DE:13.0) having a water content of 3.9%, a packed bulk density of 0.62 g/ml and a spherical shape of 50 mesh pass (Tyler) were well kneaded manually by means of a stainless spatula for 1 min. in a 250 ml plastic vessel. Then 3 parts by weight of glycerin were added to the resultant mixture and then kneaded for 10 min. at 40° C., thereby obtaining a powdery oil composition product.

The thus obtained powdery oil composition product had a water content of 5.7%, an average particle diameter of 930 μm, a maximum particle diameter of 3.5 mm and an angle of repose of 42°. The powdery oil composition product did not exhibit any exudation of oil and had an extremely good flowability.

The above-obtained powdery oil composition product was molded into cubes by compression molding, and the cubes were added to just cooked instant noodle soup, to prepare butter-flavored noodle soup. In this instance, the cubes were quickly dissolved in the hot soup, causing the butter oil to be released. The released butter oil floated on the soup without forming an emulsion.

EXAMPLE 9

35 parts by weight of sesami oil and 65 parts by weight of dextrin (DE: 3.5) having a water content of 5.3%, a packed bulk density of 0.56 g/ml and a spherical shape of 50 mesh pass (Tyler) were well kneaded for 1 min. in an upright dough mixer. Then 3 parts by weight of glycerin were added to the resultant mixture, and then kneaded for 20 min. at 20° C., thereby obtaining a powdery oil composition product.

The thus obtained powdery oil composition product had a water content of 5.7%, an average particle diameter of 1800 μm, a maximum particle diameter of 9.0 mm and an angle of repose of 50°.

The powdery oil composition product exhibited almost no exudation of oil and had a good flowability.

The thus obtained powdery oil composition product was blended with common salt, monosodium glutamate, meat extract power, soy sauce powder, and spices, thereby to prepare a Chinese soup mix. When hot water was poured onto the soup mix, it was quickly dissolved and sesami oil floated on the resultant soup. Since the oil did not form an emulsion, the flavor of the sesami oil was advantageously enhanced and the clearness of the soup was high, which are desirable qualities for a Chinese soup.

EXAMPLE 10

32.5 parts by weight of soybean oil and 67.5 parts by weight of dextrin (DE: 3.5) having a water content of 5.3%, a packed bulk density of 0.56 g/ml, a spherical shape of 50 mesh pass (Tyler) were well kneaded for 10 min. using VERTICAL GRANULATOR (tradename of a high speed stirring granulator manufactured and sold by FUJI SANGYO CO., LTD. Japan) (main screw: 400 rpm, cross screw: 3000 rpm). After the kneading, 3 parts by weight of glycerin were sprayed onto the resultant mixture (flow rate: 23 g/min) while continuously agitating the mixture, followed by kneading for 10 min. at 45° C. (main screw: 300 rpm, cross screw: 3000 rpm), thereby obtaining a powdery oil composition product.

The thus obtained powdery oil composition product had a water content of 6.8%, an average particle diameter of 300 μm, a maximum particle diameter of 2.0 mm and an angle of repose of 52°. The powdery oil composition product exhibited almost no exudation of oil and had a good flowability.

EXAMPLE 11

An emulsion was prepared by emulsifying 32.5 parts by weight of soybean oil with 3 parts by weight of glycerin in a household mixer. Then, the emulsion was sprayed onto 67.5 parts by weight of dextrin (DE:3.5) having a water content of 5.3%, a packed bulk density of 0.56 g/ml and a spherical shape of 50 mesh pass (Tyler) at a flow rate of 63 g/min, while fluidizing the dextrin in NEW MARUMERIZER (tradename of a fluidized-bed granulator having an agitating element, manufactured and sold by FUJI PAUDAL CO., LTD, Japan)(rate of rotation of agitating element: 300 rpm; rate and temperature of upward air flow: 2 m³/min and 40° C.). After completion of the spraying, the fluidization was further continued for 10 min. at 40° C., thereby obtaining a powdery oil composition product.

The thus obtained product had a water content of 5.7%, an average particle diameter of 400 μm, a maximum particle diameter of 2.0 mm and an angle of repose of 48°.

The thus obtained powdery oil composition product exhibited almost no exudation of oil and had a good flowability.

EXAMPLE 12

3 parts by weight of glycerin were sprayed onto 67.5 parts by weight of dextrin (DE: 3.5) having a water content of 5.3%, a packed bulk density of 0.56 g/ml and a spherical shape of 50 mesh pass (Tyler) at a flow rate of 1.5 g/min, while fluidizing the dextrin in the same manner as in Example 11. 5 min. after the spraying, 32.5 parts by weight of soybean oil were sprayed onto the resultant mixture (flow rate:4.5 g/min) and fluidization was further continued for 5 min.

The resultant powdery oil composition product had a water content of 5.5%, an average particle diameter of 400 μm, a maximum particle diameter of 1.5 mm and an angle of repose of 50°.

The powdery oil composition product exhibited almost no exudation of oil and had a good flowability.

EXAMPLE 13

37.5 parts by weight of lard which had been melted in a hot bath at 55° C. and 62.5 parts by weight of gelatin (molecular weight:3000 to 5000) having a water content of 7.2%, a packed bulk density of 0.48 g/ml and a spherical shape of 50 mesh pass (Tyler) were well kneaded for 1 min. in an upright dough mixer and then 3.5 parts by weight of glycerin were added to the resultant mixture, followed by kneading for 1 min. at 55° C.

Thereafter, the resultant mixture was extruded by SOFT RYUZER (tradename of an extrusion granulator manufactured and sold by FUJI PAUDAL CO., LTD., Japan) through a screen of 14 mesh (Tyler) (mesh space: 1180 μm), thereby obtaining a granular fat composition product.

The thus obtained granular fat composition product had a water content of 7.4% and an angle of repose of 45°. Further, the product had a maximum particle diameter of 3.5 mm and, therefore, had an average particle diameter of not greater than 3.5 mm. The granular fat composition product exhibited no exudation of fat and had an extremely good flowability.

The granular fat composition product was blended with common salt, soy sauce powder, monosodium glutamate, several extract powders, sugar and spices, to thereby prepare a soup mix for noodle soup. When hot water was poured onto the soup mix, the lard was rapidly separated from the soup mix and floated on the soup. Since the fat did not form an emulsion, the soup had a high clearness and the flavor of the lard was enhanced.

EXAMPLE 14

50 parts by weight of butter oil which had been melted in a hot bath at 45° C. and 50 parts by weight of soy sauce powder having a water content of 11.0%, a packed bulk density of 0.70 g/ml and a spherical shape of 50 mesh pass (Tyler) were well kneaded for 1 min. in an upright dough mixer and then 2 parts by weight of glycerin were added to the resultant mixture, followed by kneading for 1 min. at 45° C.

Thereafter, the resultant mixture was extruded by means of SOFT RYUZER (tradename of an extrusion granulator manufactured and sold by FUJI PAUDAL CO., LTD., JAPAN) through a screen of 20 mesh (Tyler) (mesh space: 850 μm), thereby obtaining a granular oil composition product.

The thus obtained granular oil composition product had a water content of 12.0% and an angle of repose of 51°. Further, the product had a maximum particle diameter of 3.5 mm and, therefore, had an average particle diameter of not greater than 3.5 mm. The granular oil composition product exhibited almost no exudation of oil and had a good flowability.

The granular oil composition product can be used in, e.g., various types of soup mixes, such as soup mixes for Chinese-noodle soup, steak sauce, etc.

REFERENCE EXAMPLE 33 parts by weight of soybean oil, 67 parts by weight of hydrolyzed vegetable protein having a water content of 8.3%, a packed bulk density of 0.75 g/ml and a spherical shape of 100 mesh pass (Tyler), 3 parts by weight of glycerin and 260 parts by weight of water were subjected to emulsification by a household mixer and then to spray-drying, thereby obtaining a powdery oil composition product.

The thus obtained powdery oil composition product had a water content of 10.6%, an average particle diameter of 100 μm, a maximum particle diameter of 0.5 mm and an angle of repose of 55°. The powdery oil composition product exhibited no exudation of oil and had a good flowability.

EXAMPLE 15

To 100 parts by weight of a commercially available solid curry roux mix (oil content: 37%, water content 3.2%) which had been melted in a hot bath at 55° C. were added 2 parts by weight of glycerin. The glycerin was uniformly dispersed therein by kneading the mixture for 1 min. at 55° C. manually by means of a stainless spatula in a 250 ml plastic vessel. Thereafter, the resultant mixture was extruded by means of SOFT RYUZER (tradename of an extrusion granulator manufactured and sold by FUJI PAUDAL CO., LTD, Japan) through a screen of 14 mesh (Tyler) (mesh space: 1180 μm), thereby obtaining a granular curry roux mix.

The granular curry roux mix had a water content of 3.5% and an angle of repose of 52°. Further, the product had a maximum particle diameter of 3.5 mm and, therefore, had an average particle diameter of not greater than 3.5 mm. The granular curry roux mix exhibited no exudation of oil and had a good flowability.

EXAMPLE 16

35 parts by weight of a seasoning oil obtained by heating garlic in a vegetable oil and 65 parts by weight of dextrin (DE:9.0) having a water content of 5.5%, a packed bulk density of 0.62 g/ml and a spherical shape of 50 mesh pass (Tyler) were well kneaded manually by means of a stainless spatula for 1 min. in a 250 ml plastic vessel. Then 3 parts by weight of glycerin were added to the resultant mixture and then kneaded for 5 min. at 20° C., thereby obtaining a powdery oil composition product.

The thus obtained powdery oil composition product had a water content of 6.0%, an average particle diameter of 1200 μm, a maximum particle diameter of 6.5 mm and an angle of repose of 50°.

The powdery oil composition product exhibited almost no exudation of oil and had a good flowability.

The above-obtained powdery oil composition product was blended with the granular fat composition product obtained in Example 13, common salt, soy sauce powder, monosodium glutamate, extract powders, sugar and spices to thereby prepare a soup mix for noodle soups. When hot water was poured onto the soup mix, the oil was quickly separated from the soup mix and floated on the soup, thereby causing the garlic flavor of the oil to be enhanced.

What is claimed is:

1. A solid powdery or granular, fat or oil composition having excellent flowability, comprising (a) a fat or oil, (b) a base material having said fat or oil included therein by occlusion or absorption and (c) a liquid polyol having at least two hydroxyl groups, said composition being in the form of a powder or granules having a water content of 10% by weight or less, a maximum particle diameter of not greater than 10 mm, an average particle diameter of not greater than 2 mm an angle of repose of not greater than 60°, the proportions of said fat or oil, said base material and said polyol being, respectively, 20 to 50% by weight, 40 to 78% by weight and 2 to 10% by weight, based on the total weight of the components (a), (b) and (c), said base material being at least one member selected from the group consisting of hydrophilic proteins, hydrophilic polysaccharides, partially hydrolyzed proteins, partially hydrolyzed starch, hydrophilic amino acids and salts thereof, saccharides, organic acids and salts thereof, nucleotides and salts thereof, and common salts, and/or a food composition containing said member, said polyol being selected from the group consisting of glycerin, non-toxic glycols, saccharides and sugar alcohols.

2. The fat or oil composition according to claim 1, wherein said base material has a water content of 15% by weight or less.

3. The fat or oil composition according to claim 1, wherein said base material has a packed bulk density of not greater than 0.9 g/ml.

4. A process for producing a solid powdery or granular, fat or oil composition having excellent flowability, which comprises intimately mixing 20 to 50% by weight, based on the total weight of the components (a), (b) and (c), of (a) a fat or oil, 40 to 78% by weight, based on the total weight of the components (a), (b) and (c), of (b) a base material capable of occlusion or absorption of said fat or oil and 2 to 10% by weight, based on the total weight of the components (a), (b) and (c), of (c) a liquid polyol having at least two hydroxyl groups, the intimate mixing of the components (a), (b) and (c) being performed by mixing two different components selected from the components (a), (b) and (c) and mixing the resultant mixture with the remaining component or by mixing the components (a), (b) and (c) simultaneously, the mixing in which the component (a) is involved in being performed at a temperature higher than the melting point of said fat or oil, said base material being at least one member selected from the group consisting of hydrophilic proteins, hydrophilic polysaccharides, partially hydrolyzed proteins, partially hydrolyzed starch, hydrophilic amino acids and salts thereof, saccharides, organic aids and salts thereof, nucleotides and salts thereof, and common salts, and/or a food composition containing said member, said polyol being selected from the group consisting of glycerin, non-toxic glycols, saccharides and sugar alcohols.

5. The process according to claim 4, wherein said base material has a water content of 15% by weight or less.

6. The process according to claim 4, wherein said base material has a packed bulk density of not greater than 0.9 g/ml.

7. The process according to claim 4, wherein the total water content of said (a) fat or oil, (b) base material and (c) polyol at the time of mixing the components (a), (b) and (c) is 15% by weight or less.

8. The fat or oil composition according to claim 1, wherein said base material has a packed bulk density of not grater than 0.9 g/ml and is in the form of a powder comprising spherical particles each having a particle diameter of not greater than that which passes a 100 mesh screen.

9. The process according to claim 7, wherein said base material has a packaged bulk density of not grater than 0.9 g/ml and is in the form of a powder comprising spherical particles each having a particle diameter of not greater than that which passes a 100 mesh screen.

* * * * *